Patented Apr. 7, 1936

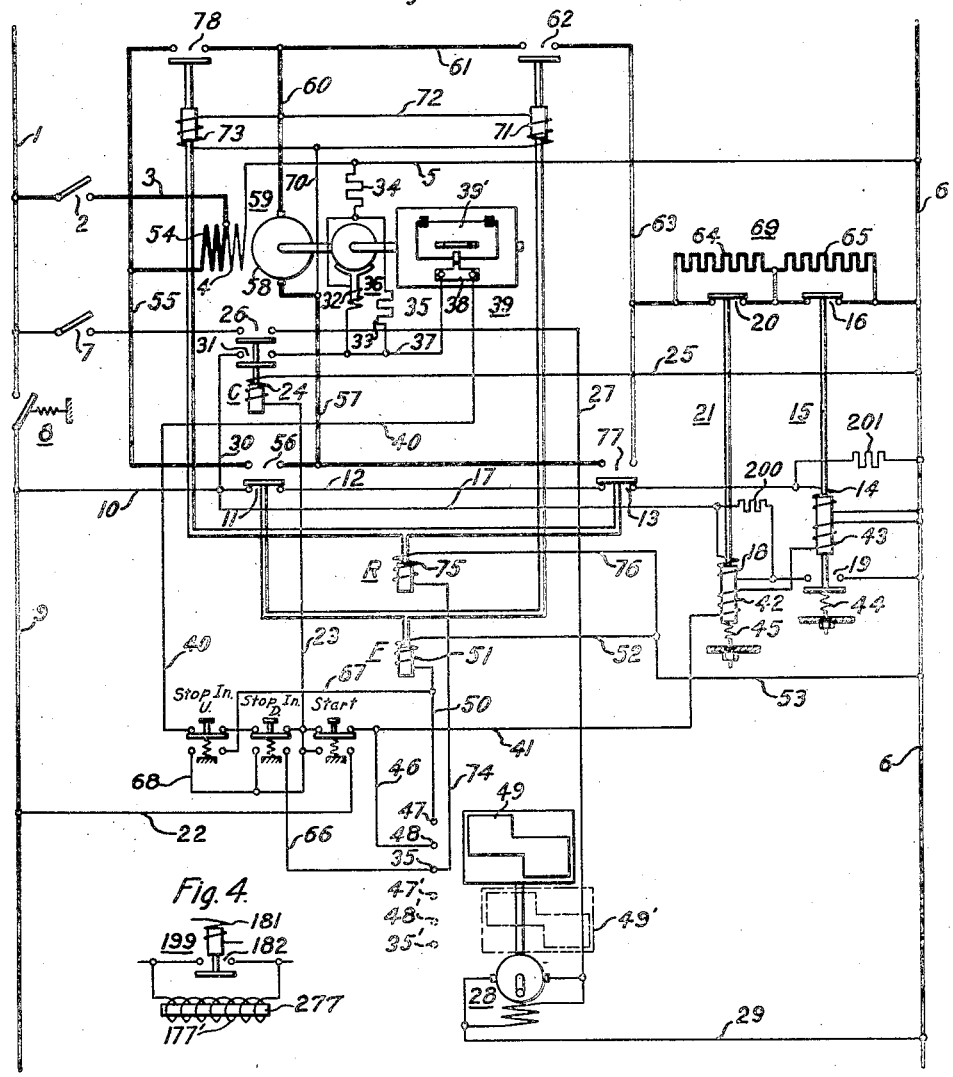

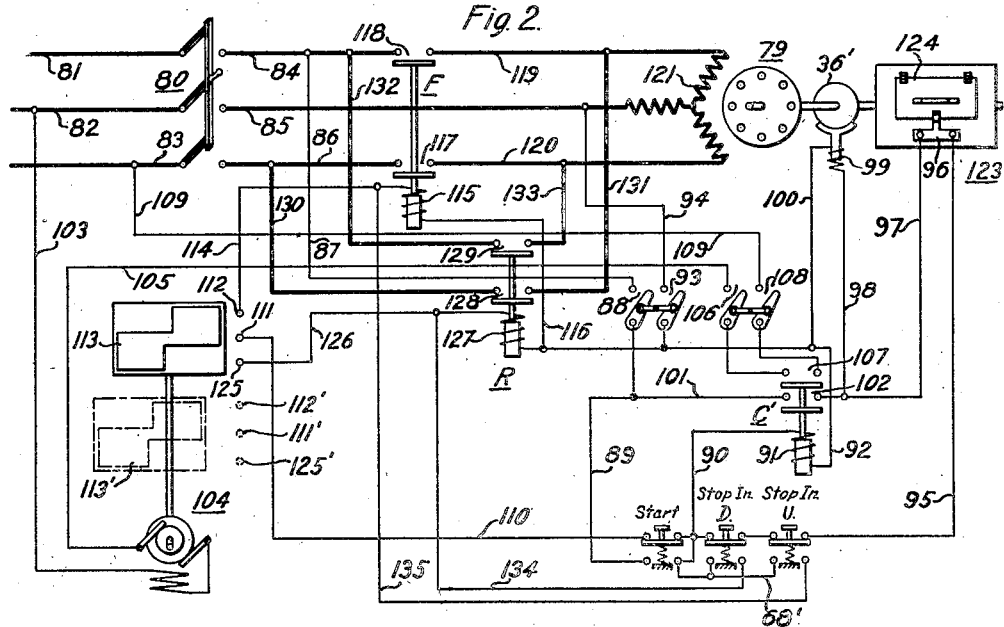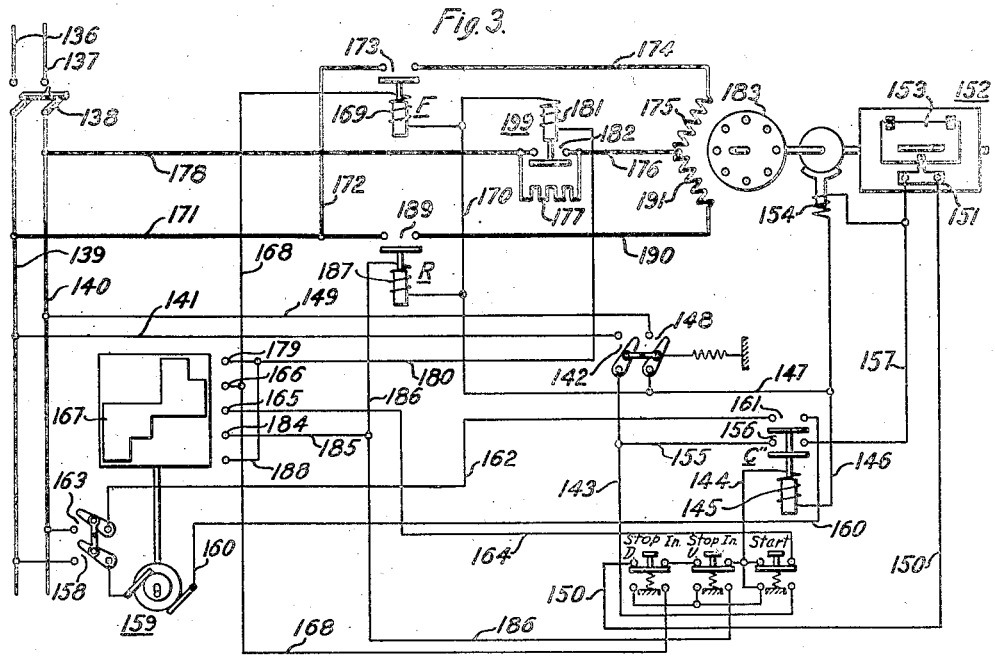

2,036,201

UNITED STATES PATENT OFFICE 2,036,201

LAUNDRY WASHER CONTROL

Robert S. Elberty, Jr., Wilkinsburg, Pa., and George C. Pearce, Dayton, Ohio, assignors to Westinghouse Electric & Manufacturing Company, a corporation of Pennsylvania Application September 29, 1931, Serial No. 565,753

3 Claims. (Cl. 172—240)

This invention relates to electrical control systems for reversing motors and particularly motors driving laundry equipment, such as washing machines and extractors, or any other industrial equipment, such as planers, or the reversing roll tables of rolling mills.

With the washing machines commonly used in laundries, some difficulty is experienced in arresting the removable cover of the cylinder in registry with the removable cover of the enclosing housing, and attendants are frequently injured because present systems of control are not "fool-proof".

One object of our invention is to provide a simple, inexpensive and substantially "fool-proof" system of control for electric motors.

A further object of our invention is the provision of a system of control for accelerating the motor during starting operation in response to the inductive time constants of the accelerating means.

A further and more specific object of our invention is the provision of a plurality of normally closed inductive-time-limit accelerating contactors disposed to be deenergized when the motor is energized to accelerate the motor to normal operating speed by inductive time.

It is also an object of our invention to prevent starting of the motor unless the attendant and certain elements of the machine driven by the motor are in predetermined positions.

Other objects and advantages will become apparent from a study of the following specification, when considered in conjunction with the accompanying drawings, in which:

Figure 1 is a diagrammatic showing of our system of electrical control when utilized in connection with a source of direct-current power;

Fig. 2 is a diagrammatic showing of our system of electrical control when utilized in connection with a three-phase source of alternating-current power;

Fig. 3 is a diagrammatic showing of the subject matter of Fig. 2 as modified to operate with a single-phase source of alternating-current power; and, Fig. 4 is a modification, diagrammatically showing the use of an iron core reactor with the accelerating relay.

In the drawings, and particularly in the modification shown in Fig. 1, our system of control is devised to control the motor-operated washer 39 from a source of direct-current electrical energy. As is the usual practice in laundries, the direction of rotation of the washer 39 is periodically reversed. To accomplish this, the washer, in the more modern practice, is operated by a reversing motor. This motor is shown at 59 and is provided with shunt field windings 4 and series field windings 54 and, for purposes of reversing the motor, is provided with a forward directional contactor F and a reverse directional contactor R.

In order not to subject the motor armature to excessive starting currents, a starting resistor 69 is connected in circuit relation with the armature of the motor, and the sections 64 and 65 of the starting resistor are controlled by a pair of normally closed accelerating contactors 15 and 21. These accelerating contactors, though normally spring biased to circuit-closing position, are nevertheless so arranged in the system of control that the armature of the motor cannot be connected directly to the source of supply, while the contacts of the accelerating contactors are in circuit closing position.

To effect the periodic reversing of the motor 59, a timer motor 28 is utilized to drive one or more controller drums for controlling the energization of the forward directional contactor F and the reverse directional contactor R. The timer motor 28 may be any suitable constant-speed motor and is usually arranged to operate a plurality of controller drums, the drums being so arranged that only one motor 59 can be reversed at a time. The system of control and machines diagrammatically shown in Fig. 1 represents only one of a series of similar equipments, and the timer motor functions to prevent the starting of more than one motor, and the machine driven thereby, at a time.

It is, of course, obvious that the system of control shown in Fig. 1 is not limited to the control of a washer or extractor but is equally useful for the control of the roll table of a rolling mill, the planer platen of a planer or any other machine where a reciprocatory motion of an element of a machine is desired.

A more complete understanding of the novel results of the subject matter shown in Fig. 1 can be had from a study of the operation of the equipment shown.

Assuming that the main-line conductors or buses 1 and 6 are energized and that knife switches 2 and 7 are in circuit-closing position, closing of the knife switch 2 obviously establishes an energizing circuit for the shunt field windings 4 of the motor 59 by a circuit extending from the conductor or bus 1, through the knife switch 2, conductor 3, shunt field winding 4 and conductor 5, to the energized bus 6. The closing of the switch 7 cannot establish any circuits until the control relay C has operated to close the contact members 26. In fact, no operating circuits can be established until the "Start" push-button switch and the safety switch 8 have been moved to circuit-closing positions.

For the benefit of the attendant controlling the operation of the washer 39, the arrangement of the "Start" push-button switch and the safety switch 8 is such that the attendant must be in a given position before the washer 39 can be started in operation, thereby preventing accidents to the attendant. The switch 8, however, is usually of the type that can be latched to circuit-closing position, and, since the normal starting of the machine is controlled by the contact members 38 on the door 39' of the washer, the suggested safety features are not as important during normal operation as are the safety features hereinafter discussed in connection with the inching operation of the machine.

If the switch 8 is held or latched in circuit-closing position, conductor 9 is energized, and a circuit is established from conductor 9, through conductor 10, the back or normally-closed contact members 11 of the forward directional contactor F, conductor 12, the back or normally closed contact members 13 of the reverse directional contactor R and the magnetizing coil 14 of the accelerating contactor 15, to the energized conductor 6.

It should be noted that coil 14 is energized a fixed amount from the constant potential source of electrical energy represented by conductors 1 and 6. The magnetic energization will thus have a fixed value and the accelerating contactor 15 will, for any given adjustment, have a fixed time constant independent of the operating characteristics of the motor. The time constant may, however, as intimated, be adjusted within relatively wide limits by a suitable selection of characteristics for the neutralizing winding 43 and the proper adjustment of the spring arrangement 44.

Since the magnetizing coil 14 is the main or operating coil of the accelerating contactor 15, the contact members 16, shunting the starting resistor 65, are immediately opened, and the contact members 19 are operated to circuit-closing position, whereupon a second circuit is established from the energized conductor 10, through conductor 17, the magnetizing coil 18 of the accelerating contactor 21 and contact members 19, to the energized conductor 6. The energization of the actuating coil 18 similarly effects the opening of the contact members 20 of the accelerating relay 21, thereby opening the shunt circuit for the starting resistor section 64. From the foregoing operation, it will be obvious that the starting resistor 69 is placed in circuit between the conductor 63 and the conductor 6 prior to the energization of the motor 59.

Since the coil 18 is energized a fixed amount and, as connected, is not influenced by the operating characteristics of the motor, the time-limit accelerating contactor will, for any given adjustment, have a fixed time constant.

To effect the starting of the motor 59, the "Start" push button is actuated, whereupon a circuit is established from the energized conductor 9, through conductor 22, the "Start" push-button switch, conductor 23, actuating coil 24 of the control relay C and conductor 25, to the energized conductor 6. The closing of the contact members 26 of the control relay C establishes an operating circuit for the timer motor 28 from conductor 1, through switch 7, contact members 26, conductor 27, timer motor 28 and conductor 29, to the bus 6.

Our system of control through the controller segments 49, 49', etc., is designed to control a series of motors of which the motor 59 is one. If the controller segments 49 and 49', shown in development, are in the position illustrated with reference to the contact fingers at the left, no operating circuits for the respective motors can be established.

The control relay C for the motor 59 releases the magnetic brake 36. The circuit for the brake may be traced from the energized conductor 10, through conductor 30, contact members 31 of the control relay C, conductor 37, the actuating coil 32 of the brake 36, connected in parallel with the resistor 33, and the resistor 34, to the energized conductor 5. The resistors 33 and 34 obviously limit the current drawn by the actuating coil 32, and the resistor 33 also functions as a discharge resistor when coil 32 is deenergized.

A holding circuit is also established for the actuating coil 24, which may be traced from the energized conductor 37, through the contact members 38 on the door 39' of the washer 39, conductor 40, the upper or normally closed contact members of the "Stop" or inch up, "In. U.", push-button switch, the "Stop" or inch down, "In. D." stop push button, the conductor 23, actuating coil 24, to the energized conductor 25. From the circuit just traced, it will be apparent that, if the "Start" push-button switch is released and the door of the washer 39 is not closed, thereby closing the contact members 38, the actuating coil 24 will be deenergized, and the timer motor 28 will stop operation, and also the circuits for the directional contactors cannot be established, thereby making it impossible to start the motor unless the door 39' is closed. The directional contactors cannot be energized when contact members 38 are in open-circuit position, because conductors 40 and 46 and the controller segment 49 cannot be energized.

If the door 39' is properly closed, thereby energizing conductor 40, the conductor 46 is energized through the normally closed contact members of the push-button switches, thereby establishing an energizing circuit for the forward directional contactor F, which circuit may be traced from the energized conductor 46, through contact fingers 47 and 48—bridged by the controller segment 49—conductor 50, actuating coil 51, and conductors 52 and 53, to the main-line conductor or bus 6. The neutralizing coils 42 and 43 of the accelerating contactors 21 and 15 are also energized after the door of the washer is closed, the "Start" push-button switch has been released, and the control relay C has operated. This circuit may be traced from the energized conductor 46, through conductor 41 and neutralizing coils 42 and 43, to the bus 6. The neutralizing coils 42 and 43 need not necessarily be connected as described but may be connected directly and permanently across conductors 9 and 6. In either case the neutralizing coils produce a fixed neutralizing effect for any adjustment of the coils and thus control the time constants of the respective accelerating relays 15 and 21 independent of the operating characteristics of the motor.

The accelerating contactors 15 and 21 per se, do not constitute a part of this invention. However, these contactors effect acceleration of the motor within a predetermined interval of time. In design, these contactors embody substantially the subject matter shown in the Willard G. Cook Patent No. 1,753,983, April 8, 1930, assigned to the Westinghouse Electric & Manufacturing Company. The time constant of these accelerating contactors may be very accurately adjusted by the adjustable-spring arrangement shown at 44 and 45 and a proper selection and adjustment of the coils 43 and 42.

Operation of the forward directional contactor F establishes an armature circuit for the motor 59 which may be traced from the energized conductor 3, through series field winding 54, conductor 55, contact members 56, conductor 57, armature 58, conductors 60 and 61, contact members 62, conductor 63 and resistor sections 64 and 65 of the starting resistor 69 to the conductor 6.

It will be noted that the operation of the directional contactor F also interrupts the circuit for the magnetizing coil 14 of the accelerating contactor 15 at the contact members 11. Since the magnetizing coil 14 is deenergized, the accelerating contactor 15, after a predetermined interval of time, depending upon the resistance value of discharge resistor 201, the time constants of coil 14 and the neutralizing coil 43 and the adjustment of the spring arrangement 44 and not upon any operating characteristics of the motor 59, closes the contact member 16, thereby shunting the resistor section 65. Since the contact members 19 are moved to open-circuit position by the deenergization of the accelerating contactor 15, the magnetizing coil 18 of the accelerating contactor 21 is deenergized and, in consequence, the resistor section 64 is shunted at the contact members 20 after a predetermined interval of time, depending upon the resistance value of discharge resistor 208, the time constants of coil 18 and the neutralizing coil 42 and the adjustment of the spring arrangement 45 and not upon any operating characteristic of the motor 59.

From the operation just discussed, it is obvious that the motor 59 is accelerated within a predetermined interval of time independent of its operating characteristic and that this acceleration is effected by but one inductive time-limit contactor for each starting resistor section, and that no special "set-up" relays or auxiliary circuits are necessary to accelerate the motor or to establish operating circuits for the accelerating contactors.

After the washer has operated in a given direction for a definite period of time, depending upon the timing motor 28, the circuit for the actuating coil 51 is interrupted at the contact fingers 47. Back coils 71 and 73 of the directional contactors F and R are connected directly across the armature of the motor when contact members 56 and 62 open and these coils will thus be subject to the full counter-electromotive force of the motor 59, thereby effectively sealing the contact members 11 and 18 in the circuit-closing position, whereupon the magnetizing coils 14 and 18 are successively energized, as heretofore explained, and the shunt circuits for the starting resistor sections are again interrupted. After this operation has been effected, the controller segment 49 bridges the contact fingers 48 and 35, thereby establishing a circuit from the energized segment 49, through conductor 74, actuating coil 75 of the reverse directional contactor R and conductors 76 and 53, to the bus 6. The operation of the directional contactor R effects the closing of the contact members 77 and 78, thereby establishing a reverse circuit for the motor 59 and also effects the deenergization of the magnetizing coil 14 of the accelerating contactor 15. The accelerating contactors 15 and 21 thereupon effect the acceleration of the motor 59 in the reverse direction, in the manner heretofore explained for forward operation.

If, during operation, either one of the "Stop" push-button switches is actuated, the motor is stopped. However, the door on the drum of the washer very frequently is not brought into registry with the door on the enclosing casing of the laundry machine. It is, therefore, desirable that the drum of the washer be inched to position and this inching operation is usually done when the door of the washer is open. Obviously, if the attendant is at the door and inching is effected, accidents may readily occur. To prevent any accidents, the "Stop" push-button switches and the "Start" push-button switches are so disposed that the attendant must use both hands to effect inching operation and, therefore, can observe the movement of the drum during inching operation with the door open, but he cannot be in the position to be injured by the movement of the drum.

This safety feature is accomplished by the arrangement shown at the various push-button switches. By this arrangement, after the washer has been stopped, inching cannot be effected in the up or down direction unless the "Start" push-button switch is also actuated. That is, if the attendant wishes to inch in the up direction, the "Stop" push-button switch at the extreme left is moved to close its lower contact members, and the "Start" push-button switch is depressed to close the lower contact members, thereby establishing a circuit for the forward directional contactor F. The circuit for this contactor may be traced from the energized conductor 3, through conductor 22, the lower contact members of the "Start" push-button switch, the conductor 66, the lower contact members of the inch up, "In. U.", "Stop" push button and conductor 67, to the actuating coil 51 of the forward directional contactor. Similarly, if it is desired to inch in the down direction, the reverse directional contactor is energized by actuating the two push-button switches at the right, thereby establishing a circuit from conductor 22, through the two push-button switches mentioned, to conductors 69 and 76 to the actuating coil 75.

The system of control and the mechanical equipment associated with the motor and the control system illustrated in Fig. 1 represent but one of a series of such equipments. Obviously, in a large laundry, the number of units may be considerable. However, since these washers or extractors of the laundry equipment are continually started and stopped, it is obvious that the load on the power plant or central power station of the laundry may vary over a wide range to the injury of the main generators or other equipment, unless some provision be made to prevent the starting or reversing of more than one machine at a time. This additional controlling action is readily effected by the timer motor 28, that is disposed to operate a plurality of controller segments 49, 49', etc. which permits the successive establishment of circuits for the motors operating the washers.

In the modification shown in Fig. 2, the control system is devised to cooperate with a three-phase source of alternating-current power, and is designed to control the washer 123 and the motor 79 driving the washer, in the same manner as the motor 59 and the washer 39 are controlled in the system shown in Fig. 1.

Assume that the conductors 81, 82 and 83 are energized from a suitable three-phase source of supply and that switch 80 is in circuit-closing position, thereby energizing the conductors 84, 85 and 86. If the switch members 88 and 92 and 106 and 108 are in circuit-closing positions and the "Start" push-button switch is actuated, a circuit is established from the energized conductor 84, through conductor 87, switch 88, conductor 89, lower or normally open contact members of the "Start" push button switch, conductor 90, actuating coil 91 of the control relay C', conductor 92, switch 93 and conductor 94, to the energized conductor 85.

A circuit is also established for the electromagnetic brake 96'. This circuit may be traced from the energized conductor 90, through the normally closed contact members of the two "Stop" push-button switches at the right, conductor 95, contact members 96 on the door 124 of the washer 123, conductors 97 and 98, actuating coil 99 of the electromagnetic brake 96' and conductor 100, to the energized conductor 92. It will be noted that the actuating coil 99 of the electromagnetic brake cannot be energized during the actuation of the "Start" push-button switch unless the contact members 96 on the door 124 of the washer are in circuit-closing position. It is, therefore, obvious that the electro-magnetic brake 96' will prevent the starting of the washer unless the door is sealed to closed position.

Immediately after the operation of the control relay C', a holding circuit is established for its actuating coil 91. This holding circuit extends from the energized conductor 101, through the contact members 102, conductor 97, contact members 96, conductor 95, the normally closed contact members of the "Stop" push-button switches and conductor 90, to the actuating coil 91. It is, therefore, obvious that, after the "Start" push-button switch is released, if the door 124 is not closed, the control relay C' will not remain energized and starting of the motor 79 cannot be effected even though the controller segment 113 driven by the timer motor 104 may be in such position that a motor circuit might be established.

Operation of the control relay C' also establishes a circuit from the energized conductor 89, through conductor 103, the constant-speed timer motor 104, conductor 105, switch 106, contact members 107, switch 108, and conductor 109, to the energized conductor 83. The timer motor, thus being energized, effects movement of the controller segment 113 toward the right and, after the release of the "Start" push-button switch, a circuit is established from the energized conductor 99, through the "Start" push-button switch, conductor 110, contact fingers 111 and 112—bridged by the controller segment 113—conductor 114, actuating coil 115 of the forward directional contactor F and conductor 116, switch member 93 and conductor 94, to the energized conductor 85.

With the closing of the contact members 117 and 118, conductors 119 and 120 and, in consequence, the primary windings 121 of the motor 79, are energized, and the motor 79 operates the washer in a given direction. After a predetermined number of revolutions in a given direction, the forward direction, have been accomplished, the timer motor 104 interrupts the circuit for the actuating coil 115 at the contact finger 112 and a moment later an energizing circuit is established for the actuating coil 127 of the reverse directional contactor R. This circuit may be traced from the energized controller segment 113, through the contact finger 125, conductor 126 and actuating coil 127, to the energized conductor 116. The cycle of operation may, therefore, be repeated an unlimited number of times by the timer motor, and the motor 79 comes to rest only after one of the "Stop" push-button switches has been actuated.

The safety feature discussed in connection with the modification shown in Fig. 1 is also a part of this modification. It is obvious that, after the one or the other of the "Stop" push-button switches is actuated, the directional contactors are deenergized and, for the inching operation, can only be energized from the conductors 134 and 135 when both the "Start" push-button switch and the one or the other of the "Stop" push-button switches is actuated. If the "Start" push-button switch and "Stop" inch down, "In. D." are actuated, a circuit is established from the energized conductor 99, through conductor 68' and conductor 135, to the actuating coil 127 of the reverse directional contactor R, whereupon the contact members 128 and 129 are moved to circuit-closing positions, and the primary windings 121 are energized for reverse operation of the motor 79 through the circuits of conductors 130 and 131 and 132 and 133.

In the modification shown in Fig. 3, our invention is illustrated in combination with a single-phase source of alternating-current power. In the utilization of a single-phase source of alternating-current power, an alternating-current motor, designed to start without special starting equipment or a special starting equipment not part of this invention is provided. The motor is also provided with a pair of primary windings 175 and 161 which may be alternately connected in circuit relation with a source of supply to operate the motor in the one or the other direction. An accelerating contactor 166 is also utilized to shunt the starting resistor 177.

In this connection, attention is called to the modification shown in Fig. 4, where the accelerating contactor 166 is utilized to shunt the reactor 177' having an iron core 277. It is, of course, obvious that the coil of the reactor has some resistance value or may be designed to have a predetermined resistance value. The accelerating contactor 166, therefore, shunts an impedance during the accelerating period of the motor, and our invention is not to be limited to an accelerating resistor or an accelerating reactor but may include, broadly, an accelerating impedance.

Assume that the switch 138 is closed, thereby energizing the conductors 139 and 140 from the conductors 136 and 137 leading to some suitable single-phase source of alternating-current power. Assuming, further, that the safety-switch members 142 and 150 are in circuit-closing position and that the "Start" push-button switch has been actuated, the control relay C'' is thereby energized by a circuit from the energized conductor 139, through conductor 141, switch 142, conductor 143, the lower or normally open contact members of the "Start" push-button switch, conductor 144, actuating coil 145 of the control relay C'', conductors 146 and 147, switch 148 and conductor 149, to the energized conductor 140. In this modification, as in the modifications heretofore discussed, the magnetic brake is energized from the energized conductor 144, through the "Stop" push-button switches, conductor 150, contact members 151 on the door 153 of the washer 152 and actuating coil 154, to the energized conductor 147. Immediately after the operation of the control relay C", a holding circuit is established for the actuating coil 145, through the circuit including the conductor 155, the contact members 156, and conductor 157, contact members 151, to the energized conductor 150 and an energizing circuit for the timing motor 159 is also established from the conductor 139, through switch 158, timing motor 159, conductor 160, contact members 161, conductor 162 and switch member 163, to the energized conductor 140. From the foregoing discussion, it is obvious that the washer driving motor cannot begin operating unless the door of the washer is firmly closed.

After the timing motor has moved the controller segment 167 to bridge contact fingers 166 and 165, the forward directional contactor F is energized by a circuit which may be traced from the energized conductor 144, through the "Start" push-button switch, conductor 164, contact fingers 165 and 166—bridged by the controller segment 167—conductor 168, actuating coil 169 and conductor 170, to the energized conductor 147. The contact members 173 of the forward directional contactor immediately close, thereby establishing an operating circuit from the conductor 139, through conductors 171 and 172, contact members 173 and conductor 174, to one of the primary windings 175 of the motor and thence through conductor 176, accelerating resistor 177, and conductor 178 to the energized conductor 140, for driving the washer 152.

Continued operation of the timing motor 159 causes the bridging of the contact fingers 165 and 179 by the controller segment 167, thereupon establishing an energizing circuit for the accelerating contactor 199 from the energized controller segment 167 through contact finger 179, conductor 180, and actuating coil 181, to the energized conductor 170, thereby shunting the accelerating resistor 177 at the contact members 182. The armature 183 of the motor driving the washer thus comes up to normal operating speed.

After a time, depending upon the configuration of the controller segment 167 and the speed of the timing motor 159, the reverse directional contactor R is energized after the forward directional contactor has been deenergized. The circuit for the reverse directional contactor extends from the energized controller segment 167, through contact finger 184, conductors 185 and 186 and actuating coil 187, to the energized conductor 147, whereupon the operating circuit for the motor is established through the contact members 189 and conductor 190, energizing the second primary winding 191 through the circuit extending through the conductor 176, accelerating resistor 177, and conductor 178 to the energized conductor 140 and thus operating the motor in the reverse direction.

The safety features heretofore discussed in connection with the modifications shown in Figs. 1 and 2 are also a part of this modification and, for that reason, need not be again discussed in detail.

We do not wish to be limited to the specific modifications herein disclosed because it is obvious that other modifications falling well within the spirit of this invention may be devised. We wish only to be limited by the prior art and the scope of the claims forming part of this application.

We claim as our invention:

1. In an electrical control system, in combination with an oscillatory mechanism, a reversible motor and circuit therefor for operating said mechanism, current-limiting means for the motor, reversing switches for the motor, switching means for controlling said current-limiting means, a control switch for controlling the operation of said reversing switches to control the energization of said motor, and means operable after certain operations of the switching means for effecting actuation of the control switch, said switching means being responsive to the operations of the reversing switches for reversing certain operations after a predetermined interval of time.

2. In an electrical control system for controlling the operation of a motor and machine driven thereby, a motor and circuits therefor, a supply of electrical energy for the motor, a reciprocatory device driven by the motor, said device, supply of electrical energy, motor and circuits being in combination with, current-limiting means for the motor, a switch for closing a circuit through the motor, a second switch biased to normally exclude said current-limiting means from the circuit established by said first named switch, means operable after the opening of the second switch for establishing the motor circuit to operate the motor, and means associated with the second named switch and responsive to the closing of the first named switch to effect successive excluding of said current-limiting means from the motor circuit, and reversing switches for said motor also operable only after said second named switch has opened to include said current limiting means in the motor circuit.

3. A control system for electric motors supervised by an attendant, a plurality of reversing motors, a source of electrical energy for the control system of the motors, machines driven by said motors, timing means adapted to prevent the starting of more than one motor at a time, starting means for each of said motors effective to start a given motor only when the attendant performs a given act and certain elements of the machine driven by the particular motor, the starting means of which are being actuated and both hands of the attendant are in given positions, and means operated by the timing means for reversing said motors in succession.

ROBERT S. ELBERTY, Jr.
GEORGE C. PEARCE.